Sept. 18, 1951　　　　G. W. FYLER　　　　2,568,441
EXTENDED RANGE RADIO DETECTION AND RANGING SYSTEM
Filed Jan. 27, 1944　　　　　　　　　　　2 Sheets-Sheet 1
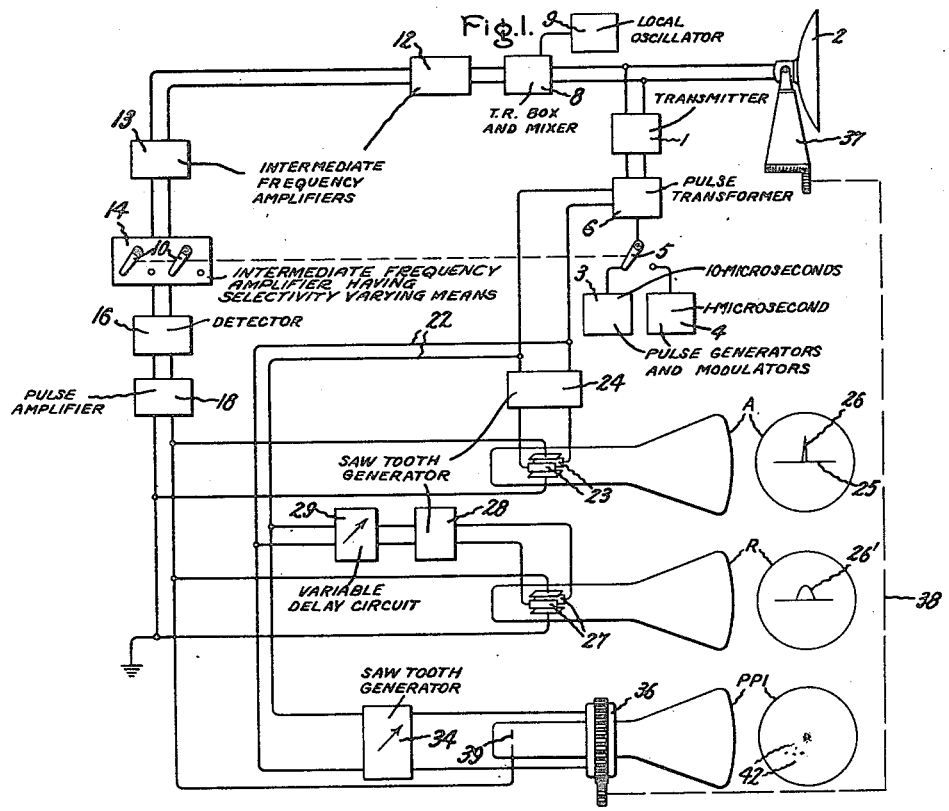
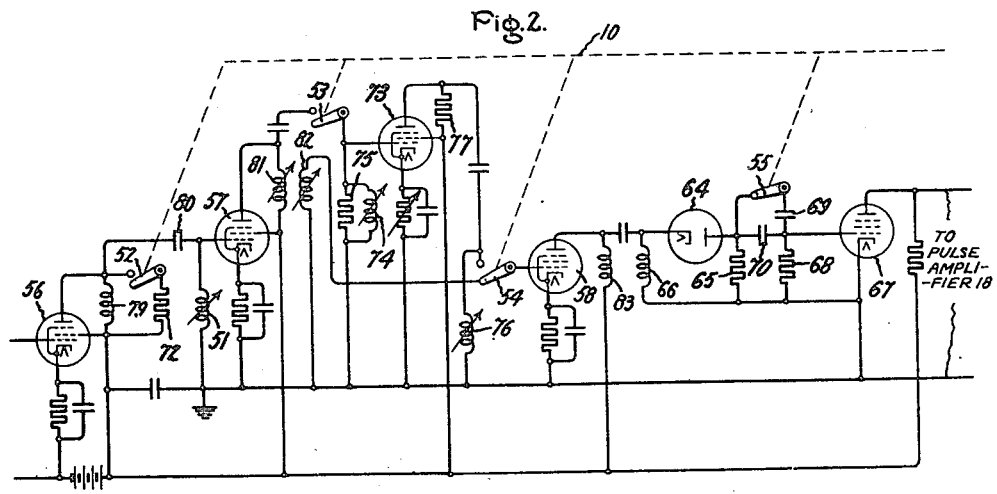
Inventor:
George W. Fyler,
by Harry E. Dunham
His Attorney.

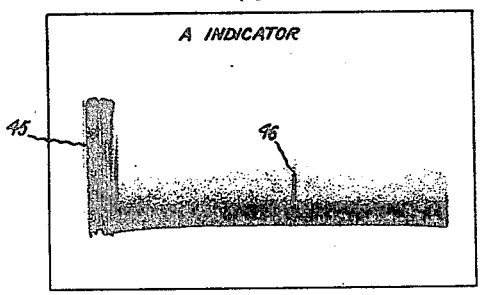
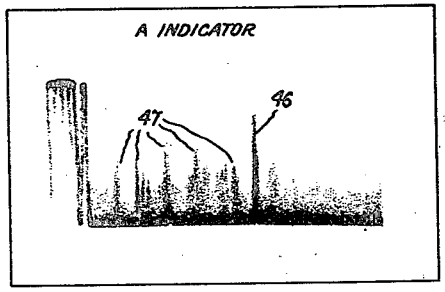
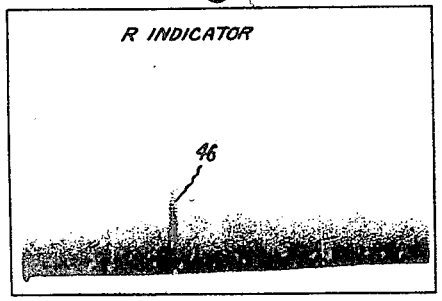
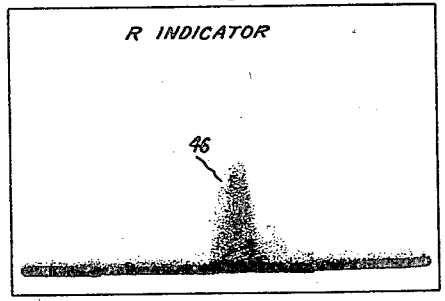
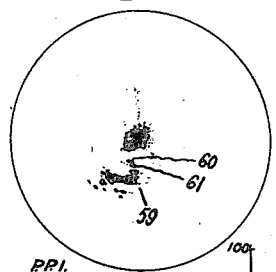
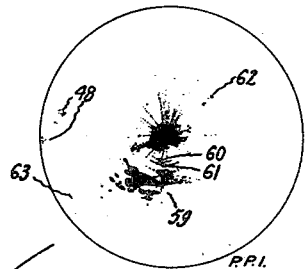
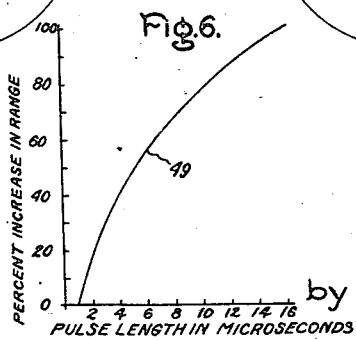

Patented Sept. 18, 1951

2,568,441

UNITED STATES PATENT OFFICE 2,568,441

EXTENDED RANGE RADIO DETECTION AND RANGING SYSTEM

George W. Fyler, Stratford, Conn., assignor to General Electric Company, a corporation of New York Application January 27, 1944, Serial No. 519,839

14 Claims. (Cl. 343—13)

My invention relates to radio detection and ranging systems in which recurrent wave pulses are radiated and echoes thereof from remote objects are received at times dependent upon the distance to such remote objects.

An object of my invention is to increase the range at which remote objects may be detected by such equipment.

Commonly in such equipment the presence of remote objects is indicated upon the viewing screen of a cathode ray device. An object of my invention is to improve the indication on such screen produced by bodies at remote distances.

Another object of my invention is to reduce the effect on said screen of undesired noise effects occurring during indication of bodies at such remote distances.

Another object of my invention is to secure these effects without reducing the resolution of the indications produced of objects nearby.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention; Fig. 2 represents a portion of the receiving equipment employed; Figs. 3a and 3b represent indications produced on the oscilloscope A of Fig. 1; Figs. 4a and 4b represent indications produced on the indicator R of Fig. 1; Figs. 5a and 5b represent indications produced on the indicator PPI of Fig. 1; Fig. 6 illustrates a characteristic indicating the improved range secured by operation of my invention.

In practicing my invention a transmitter is provided as indicated at 1 in Fig. 1 of the drawings arranged to transmit from a directive antenna system 2 pulses of equal peak intensity and of either one of a plurality of different durations. As shown this transmitter is supplied with keying pulses from either of two pulse generators 3 and 4 through a switch 5 and a step up pulse transformer 6. Generator 3 may be one adapted to produce periodic pulses of ten microseconds duration of a frequency or repetition rate of 80 pulses per second, for example, and is used during detection of objects at great distances corresponding to the maximum range of the equipment. Generator 4 is adapted to produce periodic pulses of, for example, 1 microsecond duration having a frequency or repetition rate of, for example, 800 pulses per second and is used during detection of objects at relatively short distances. Transmitter 1 produces pulses of short wavelength, for example, ten centimeters, and of duration and frequency corresponding to the duration and frequency of the pulses supplied to it from generator 3 or 4 and these pulses are radiated in a narrow beam from the antenna system 2. This system may comprise a suitable antenna arranged within a parabolic reflector by which the radiated energy is confined in the narrow beam.

To obtain maximum advantage from the use of pulses of different duration, switch 5 is arranged for unicontrol with switches generally indicated at 10 in the receiver, these switches 10 being arranged to change the selectivity of the receiver, that is, to change the width of the band of frequencies to which the receiver responds. This band width is narrow, as for example .2 megacycle wide, when long pulses are transmitted and broad, as for example 2 megacycles wide, when short pulses are transmitted.

The radiated pulses are projected through space and impinge upon remote objects, producing echoes which are intercepted by the antenna 2 and are transmitted to receiving equipment which may comprise the usual TR box 8. This equipment 8 operates to protect the equipment of the receiver from the high intensity of the pulses produced by the transmitter and to mix the received oscillations with oscillations from a local oscillator 9 to produce oscillations of a lower or intermediate frequency. The intermediate frequency oscillations are amplified by intermediate frequency amplifiers 12, 13 and 14 and detected by a detector 16. The detected pulses are amplified in the pulse amplifier 18 and may be utilized to control one or more cathode ray indicators utilized for indications of the presence of the objects from which such pulses are received.

In Fig. 1, I have indicated at A, R and PPI three cathode ray indicators connected in conventional circuits in a manner to produce indications of such echoes. The indicators A and R each comprise two pairs of deflecting plates, one for deflecting the ray in the horizontal plane over a predetermined path on the screen and the other for deflecting the ray in the vertical plane in accord with received echo pulses. The received pulses from the amplifier 18 are supplied between the vertical deflection plates of each of these two indicators A and R, and to the control electrode of the indicator PPI. The horizontal deflection plates 23 of the indicator A are connected to the output of a sawtooth generator 24 the operation of which is synchronized by pulses supplied from the pulse transformer 6. This sawtooth wave deflects the beam of the cathode ray device across the screen during the interval between radiated pulses to produce a horizontal line such as that indicated at 25 on the fluorescent screen of the cathode ray device. When an echo pulse is received it causes deflection of the ray in the vertical plane producing a vertical deflection such as that indicated at 26. The period over which the ray is deflected across the screen may be equal to the time required for a radiated pulse to travel to and return from the most remote object to be detected. Thus all objects within the range of the equipment produce deflections such as that indicated at 26 on the cathode ray screen at positions corresponding to the range to the object.

The horizontal deflection plates 27 of the indicator R are supplied with a sawtooth wave from a sawtooth generator 28, which operates to deflect the ray of the cathode ray device across its screen in a short interval of time relative to the time over which indications are produced by the device A. For example, the ray of device R may be deflected across the screen in the time required for a radiated pulse to travel a distance of two miles and return to the equipment. This sawtooth generator is likewise synchronized by pulses supplied from the pulse transmitter 6 over conductors 22 through a variable delay circuit 29 to the sawtooth generator 28. This delay circuit delays the application of the synchronizing pulse from the transformer 6 to the sawtooth generator 28 by a variable time thereby to delay the starting of the deflection of the cathode ray beam across the screen. This delay is variable so that the deflection of the cathode ray may be caused to occur at any time within the period of the horizontal deflection of the ray of device A dependent upon the distance of the remote objects to be indicated on the screen.

Since the ray of device R is deflected across the whole width of the screen in the short interval required for a pulse to travel to a remote object two miles away and return, indications of the remote pulses are spread out or they extend over a larger portion of the screen than is the case with the indication produced on the device A. Such an indication is indicated at 26' in the circle representing the fluorescent screen of the device A.

The indicator PPI, commonly known as a "plane position indicator," is employed when the parabola 2 is arranged for rotation, as in the horizontal plane, as to scan the horizon. It is shown as being supported on a mount 37 arranged for such rotation. The PPI indicator has a magnetic yoke 36 consisting of two coils on opposite sides of the neck of the cathode ray device and supplied with a sawtooth wave from sawtooth generator 34, which is similarly synchronized by pulses from the transformer 6 over conductors 22. The yoke 36 operates to deflect the ray outward from the center of the screen during a time equal to that required for a wave to travel to the most remote object to be detected and return. The yoke 36 produces a magnetic field arranged to be rotated about the cathode ray device to control the direction in which the ray is deflected. This field is mechanically connected for rotation about the PPI indicator synchronous with the rotation of the support 37 on which the parabola 2 is mounted, being geared thereto by means conventionally indicated at 38. Thus the direction in which the ray is deflected from the center of the screen is maintained in continuous agreement with the orientation of the parabola 2 during the rotation thereof.

This indicator PPI has a control grid 39, which is supplied with pulses from the pulse amplifier 18, which pulses serve to turn the ray of the device on during the presence of the pulses, the ray being extinguished at all other times. Thus remote objects are indicated on the screen of the cathode ray oscillograph as spots such as those indicated at 42 positioned in a direction from the center of the screen corresponding to the direction of the remote object.

The PPI indicator is also provided with the usual focus coil (not shown) located around the tube neck between the control grid 39 and the deflection yoke 36. This focus coil is conventional as in magnetically focused television tubes.

Figs. 3a, 3b; 4a, 4b; and 5a, 5b represent respectively the indications produced by these different indicators A, R and PPI when the switches 5, 10 are in their different positions.

Fig. 3a represents the indication produced by the indicator A when the switches 5, 10 are arranged for transmission of pulses of one microsecond duration and the receiver is arranged for reception of a broad band of frequencies. This figure is a copy of a photograph of the indication produced on such an indicator located at Bridgeport and oriented toward New York. The vertical deflections 45 at the left of the figure correspond to the nearby pulse echoes, and the narrow vertical deflection 46 indicated near the middle of the figure corresponds to a remote object and is believed to have been produced by the Empire State Building in New York city. It will be seen that this indication is a very narrow indication present in a general field of illumination, a large portion of the lower part of the field being intensely illuminated and the intensity decreasing toward the upper part of the field. This general illumination is produced by undesired extraneous influences commonly referred to as "noise."

Fig. 3b is a copy of a photograph of an indication produced on the same indicator A when the switches 5, 10 are thrown to the position where the radiated pulses have a duration of ten microseconds and the receiver is arranged for narrow band reception. It will be seen that the deflection 46 is now more prominent in the field of illumination and that numerous other vertical deflections 47 produced by other remote objects appear in the field of illumination. Moreover, it will be seen that the general illumination produced by the extraneous noise influences is much reduced, the intensely illuminated area at the bottom being much narrower and less intensely illuminated than in Fig. 3a. This improved indication is brought about by the increased intensity of the received echo and reduced reception of noise and undesired effects when the long pulses are transmitted and the echoes thereof are received with the receiver connected for narrow band reception as above explained.

Figs. 4a and 4b represent a comparison of two photographs of the indications produced on the indicator R when the variable delay circuit 29 is adjusted to cause this device to indicate the same remote object that the indicator A indicates, namely, the Empire State Building in New York. In Fig. 4a this building is indicated at 46 in a general field of illumination. In Fig. 4b this indication 46 produced by the same object is much more prominent than in Fig. 4a and the noise, as represented by the area of general illumination near the bottom of the figure, is much reduced.

Figs. 5a and 5b are the same comparison made between photographs of the indication produced by the indicator PPI with the switches 5, 10 in their respective positions. It will be seen from Fig. 5a that a number of remote land objects on Long Island are indicated at 59 and two ships on Long Island Sound are indicated at 60 and 61. In Fig. 5b these indications are still present in about the same relative positions but the spots indicating land objects are more numerous than before. In addition, a remote airplane is now indicated at 62, some distant clouds are indicated at 48, and the Empire State Building in New York city is indicated at 63.

It has been shown by the operation of the equipment as represented by the indications here portrayed that the range over which remote objects may be detected is very much greater when the switches 5, 10 are in their left hand positions increasing the length of the pulses and reducing the band width of the receiver. In fact, this range increases substantially in the relationship represented by the curve 49 in Fig. 6 of the drawing. This curve 49 is plotted between pulse length in microseconds plotted as abscissa and percent increase in range plotted as ordinates. It will be seen that with a pulse length of ten microseconds the range is substantially 78 percent greater than it is when the pulse length is of only one microsecond duration, the increase being greater for longer pulse lengths.

This improved indication of objects at large distances is important where the detection of the presence of objects located at such distances is necessary. By use of my invention involving the switches 5, 10, this advantage is secured and at the same time short pulses and wide band reception may be employed for detection of objects at shorter distances, as within a range of forty miles for example. The shorter pulses with wide band reception, as when switches 5, 10 are in their right hand position, results in greater definition or resolution of the indications of the remote objects on the screen and improved accuracy of the indication of the distance to such objects. Of course, the equipment is less sensitive to objects at great distances. In practice the transmitter may be operated at its maximum power output irrespective of the position of the switches with anode dissipation, voltage breakdown and cathode emission about the same under each condition. This means that the repetition rate of the pulses must be increased in about the same ratio that the pulse length is reduced. Thus if the pulse length is varied between one microsecond and ten microseconds, the repetition rate may be varied from 800 pulses per second to 80 pulses per second, the longer pulses being transmitted at the lower repetition rate.

In Fig. 2, I have shown in greater detail the portion of the equipment represented at 14 in Fig. 1. Of course, it will be understood that any desired means for changing the selectivity of the receiver may be employed and that the circuits indicated in Fig. 2 are presented as only one satisfactory way of accomplishing the change in selectivity of the receiver. In this figure the switch mechanism 10 is represented as comprising a plurality of switches 52, 53, 54 and 55, the switches being in the position shown when the transmitter is connected for transmission of long pulses and being in their alternate or upper position when the system is arranged for transmission of short pulses. The received pulses of intermediate frequency oscillations are supplied through amplifiers 56, 57 and 58 connected in cascade. The amplifier 56 includes in its plate circuit a choke coil 79 and tuning coil 51, which tunes the total circuit capacity to resonate at the intermediate frequency. Condenser 80 between the anode of amplifier 56 and the grid of the amplifier 57 is a coupling and blocking capacitor of relatively large capacitance. The anode circuit of the amplifier 57 includes an inductance coil 81 resonant at the intermediate frequency and which is coupled to a second coil 82 resonant at the same frequency and which is connected between the control electrode and cathode of the amplifier 58. The anode circuit of the amplifier 58 likewise includes a coil 83 resonant to this intermediate frequency. The amplified oscillations appearing on the coil 83 are supplied to the cathode of a diode rectifier 64 the cathode and anode of which are connected together through a resistance 65 and an inductance 66. The point between resistance 65 and inductance 66 is connected to the cathode of an amplifier 67 and to ground. A resistance 68 is connected between the control electrode and cathode of amplifier 67. The remote terminals of these two resistances 65 and 68 are connected together through condensers 69 and 70 when switch 55 is in the position shown and through condenser 70 alone when this switch is open.

The sharp resonances of the inductances 51, 81 and 82 render the circuit shown sharply selective to the intermediate frequency. When the switches 52—55 are operated to their alternate positions a resistance 72 is connected across the coil 79 broadening the resonance characteristic of tuning coil 51. Inductance coil 82 is removed from the circuit by switch 54 and an additional amplifier 73 is inserted in the circuit between inductance 81 and the control electrode of amplifier 58 by switch 53. This amplifier 73 includes in its grid circuit a coil 74 resonant to the intermediate frequency but which is shunted by a resistance 75 which broadens its resonance characteristic to a desired extent. Its anode circuit includes an inductance 76 resonant at the intermediate frequency but the resonance characteristic of which is damped to the desired extent by the resistance 77, which is effectively in parallel therewith. Thus it will be seen that when the switches are in the position shown, the intermediate frequency band to which the receiver responds is much narrower than that when the switches are in their alternate positions. As previously stated, when ten-microsecond pulses are transmitted the band width of the receiver is about 200 kilocycles, whereas when the pulse width is one microsecond the receiver band width is two megacycles.

Diode 64 operates as an ordinary linear detector to produce on resistances 65 unidirectional pulses corresponding in magnitude to the intensity of the electromotive force on inductance 66. These unidirectional pulses are differentiated by the circuit comprising capacitance 70 and resistance 68 and the differentiated pulses are then amplified by amplifier 67 and supplied to the pulse amplifier 18 of Fig. 1. The time constant of the differentiating circuit is increased by switch 55 which connects condenser 69 in shunt with condenser 70 when the switches are in the position for transmission of long pulses.

This differentiation of the unidirectional pulses prior to amplification has been found greatly to improve the definition, or resolution, of the indications of remote objects which appear on the screen irrespective of the distance of such remote objects. This improved definition, or resolution, may be understood when it is considered that the detector output increases logarithmically at a progressively decreasing rate as the signal input to the receiver increases. This is due to the progressive limiting which takes place in the intermediate frequency amplifiers 57, 58 and 73. Due to this limiting, strong signals appear at the output of the detector as substantially square pulses of the duration of the period over which the received signals have sufficient intensity to produce limiting. Thus all objects producing echoes of sufficient intensity to produce limiting are indicated substantially alike and without satisfactory definition between them when positioned close together.

Actually, however, since the output of the detector varies logarithmically with the input, the peaks, or tops, of such square pulses have variations therein corresponding to the variations in intensity of received signal. These variations are increased, or greatly exaggerated, by the differentiating circuit thereby producing voltage variations on resistance 68, even during periods of sufficiently strong signals to produce limiting, which are effective very materially to improve the definition, or resolution, of the indications of the remote objects.

It has been found in practice that this differentiating circuit should have a time constant equal to the duration of the radiated pulses, i. e., one microsecond for one-microsecond pulses and ten microseconds for ten-microsecond pulses. For this reason switch 55 is employed to insert condenser 69 in parallel with condenser 70 to increase the time constant for operation with long pulses.

It has also been found that when the time constant is shorter than the pulse duration the signal to noise ratio is undesirably reduced although resolution is improved. Thus sensitivity to echoes from great distances is reduced while echoes which are received are indicated with improved definition on the screen.

It will be observed that the resistance 68 is connected directly between the grid and cathode of amplifier 67 and that the grid is otherwise isolated from the cathode for unidirectional currents. Thus this resistance in combination with condenser 70, when switch 55 is open, and in combination with condenser 70 and 69 in parallel, when switch 55 is closed, determines the bias on the grid of amplifier 67 produced by grid rectification. This bias varies with the signal and tends to restore to the signal the direct current component which is removed therefrom by the capacitance couplings in the earlier portions of the circuit. This variable bias also tends to reduce the amplication of amplifier 67 for strong received signals.

While I have illustrated a particular embodiment of my invention, it will of course be understood that I do not wish to be limited thereto since various modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In a radio echo object detection system having directional means for transmitting electromagnetic wave pulses and for receiving said pulses after reception from a distant body and means for indicating the distance to said body in accord with the time elapsing between the radiated and received pulses, the method of operation which comprises the steps of directing said transmitting and receiving means in a predetermined direction to be investigated to detect objects in said direction, and increasing the length and decreasing the repetition rate of said pulses and decreasing the frequency band width of reception of said directional means to increase the distance at which objects in said direction provide definitive echoes.

2. In a system for detecting the presence of remote objects in a predetermined direction by radiation of electromagnetic pulses of high frequency energy from a directional antenna toward said objects in said direction and receiving said pulses after reflection from said objects, the method which comprises increasing the length of said pulses radiated from said antenna in said direction and reducing the frequency band width received to detect objects in said direction at increased distances.

3. In a system for detecting remote objects, the combination of a cathode ray device having a viewing screen, means to transmit recurrent pulses in a predetermined direction and to receive said pulses after reflection from said objects, means to deflect the ray of said device over a predetermined path on said screen after each of said transmitted pulses and to modulate said ray in response to said received pulses thereby to produce an indication on said screen of the distant bodies from which said echoes are received, and means to increase the range of remote bodies producing echo indications on said screen having desired definition, said means comprising means to increase the length of the pulses transmitted in said predetermined direction and to decrease the band width of said receiving means when more remote objects are to be indicated thereby to improve the indication of said reflected pulses along said predetermined path on said screen of said cathode ray device.

4. The combination, in a pulse echo object detection system, a directional carrier wave pulse transmitter oriented in a predetermined direction, a plurality of pulse sources, including a source of long pulses and a source of short pulses, means to connect said pulse sources alternatively to said transmitter to produce carrier wave pulses of corresponding length to be transmitted in said direction, a carrier wave receiver, and means uncontrolled with said last means to vary the band width of said receiver inversely with the length of said pulses thereby to provide improved definition of pulse echoes from distant objects in said direction during transmission of said long pulses and high resolution of pulse echoes from less distant objects in said direction during transmission of said short pulses.

5. The combination, in a pulse echo object detection system, a cathode ray device having a viewing screen, directional means to transmit recurrent pulses in a predetermined direction and to receive from said direction echoes of said recurrent pulses from remote objects, means to indicate said echoes on said viewing screen in position corresponding to the distance from which they are received, and means to increase the range from which said echoes may be received while maintaining desired definition of indications on said screen produced by objects at less remote distances, said means comprising means for varying the length of said recurrent pulses transmitted in said predetermined direction in direct relationship to the distances from which echoes are to be received and to vary the repetition rate thereof in inverse relationship to said distances.

6. The combination, in a pulse echo system, a cathode ray device having a viewing screen, directional means to transmit recurrent pulses in a predetermined direction and to receive from said direction echoes of said recurrent pulses from remote objects, means to indicate said echoes on said viewing screen in position corresponding to the distance from which they are received, and means to increase the range from which said echoes may be received while maintaining desired definition of indications on said screen produced by objects at less remote distances, said means comprising means for increasing the length and decreasing the repetition rate of said recurrent pulses transmitted in said direction as the distance from which echoes are received from said direction increases, and for simultaneously decreasing the frequency band width over which said receiving means responds.

7. The combination, in a pulse echo system, means to transmit recurrent pulses of predetermined duration, means to receive echoes thereof during the intervals between said pulses, said receiving means including limiting means for producing high frequency output currents increasing in intensity at a logarithmetically decreasing rate with increase in intensity of said echoes, means to rectify said output currents, a differentiating circuit with a time constant substantially equivalent to said predetermined duration for differentiating the rectified output of said last means to increase the definition between pulses produced by different echoes, and means responsive to said different pulses for visually indicating said received echoes.

8. The combination, in a pulse echo system, means to transmit recurrent pulses of predetermined duration, means to receive echoes thereof during the intervals between said pulses, said receiving means including limiting means for producing high frequency output currents increasing in intensity at a logarithmetically decreasing rate with increase in intensity of said echoes, means for producing visual indications of echoes from objects at different ranges, a differentiating circuit with a time constant substantially equivalent to said predetermined duration, means to rectify said output currents and to supply the rectified currents through said differentiating circuit to said echo indicating means to increase the definition of said visual indications of said echoes from different ranges.

9. The combination, in a pulse echo system, means to transmit recurrent pulses, means to receive echoes thereof during the intervals between said pulses, said receiving means including means to amplify said received echoes, said amplifying means producing high frequency output currents increasing in intensity at a logarithmetically decreasing rate with increase in intensity of said echoes, echo indicating means, a differentiating circuit, means to rectify said output currents and to supply the rectified currents through said differentiating circuit to said echo indicating means, and means to increase the sensitivity of said indicating means to weak echoes, said last means comprising means to increase the length of said recurrent pulses and the time constant of said differentiating circuit.

10. In combination, means to receive carrier wave pulses, amplifying and limiting means therefor having high frequency output increasing at a rate low relative to increase in intensity of the received pulses, means for producing a visual indication of said received pulses, a differentiating circuit and means to rectify said output and to supply the rectified output through said differentiating circuit to said indicating means to increase the definition of indication produced by said pulses.

11. The combination, in a pulse echo system, a directional pulse transmitter, means to operate said transmitter to transmit pulses in a predetermined direction at different repetition rates, said means comprising means to change the length of the transmitted pulses inversely with the repetition rate to maintain the transmitted power substantially constant, means to receive from said direction echoes of said pulses, and indicating means controlled by said transmitting means to indicate echoes received by said receiving means, whereby either long pulses of low repetition rate may be transmitted to produce echoes having high definition from large distances in said direction or short pulses of high repetition rate may be transmitted to produce echoes having high resolution from short distances in said direction.

12. The combination, in a pulse echo system, of means to transmit recurrent pulses and to receive echoes thereof, a viewing screen, means to indicate said echoes on said viewing screen in space sequence corresponding to the time sequence in which they are received, means to amplify the received pulses, means to rectify said amplified pulses, an amplifier having input electrodes and an input circuit connected thereto, means to differentiate the rectified pulses and to supply the differentiated pulses to said input circuit with the direct current component removed, and means connected in said input circuit tending to restore said direct current component, and means responsive to the output from said amplifier to control said indicating means.

13. The combination, in a pulse echo system, of means to transmit recurrent pulses and to receive echoes thereof, a viewing screen, means to indicate said echoes on said viewing screen in space sequence corresponding to the time sequence in which they are received, means to amplify the received pulses, means to rectify said amplified pulses, said rectifying means having an output resistance, an amplifier having an anode, a cathode and a grid, a resistance connected between said grid and cathode, and a capacitance connected to supply electromotive force from said first resistance to said second resistance with the unidirectional component removed, said capacitance and second resistance operating to differentiate said electromotive force and said capacitance and second resistance operating in combination with said input electrodes to tend to restore said unidirectional component, and means responsive to the current between said anode and cathode to control said indicating means.

14. In a system for detecting the presence of remote objects at different ranges in a predetermined direction by radiation of electromagnetic pulses toward said objects in said direction and receiving said pulses from said direction after reflection from said objects, the method of maintaining desired resolution in receiving said reflections from said direction from objects at different ranges which comprises the radiation of relatively short pulses in said direction at a relatively high repetition rate to detect the presence of objects at relatively close range, and the radiation of relatively long pulses in said direction at a relatively low repetition rate to detect the presence of objects at greater range.

GEORGE W. FYLER.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 1,979,225 | Hart | Oct. 30, 1934 |
| 2,192,975 | Kotowski et al. | Mar. 12, 1940 |
| 2,252,447 | Ulbricht | Aug. 12, 1941 |
| 2,333,688 | Shepard | Nov. 9, 1943 |
| 2,404,527 | Potapenko | July 23, 1946 |
| 2,415,095 | Varian et al. | Feb. 4, 1947 |
| 2,423,024 | Hershberger | June 24, 1947 |

FOREIGN PATENTS

| Number | Country | Date |
| --- | --- | --- |
| 113,233 | Australia | June 2, 1941 |